United States Patent [19]

Kim

[11] Patent Number: 5,493,560
[45] Date of Patent: Feb. 20, 1996

[54] APPARATUS FOR TILT ADJUSTING OF AN OPTICAL DISC PLAYER

[75] Inventor: Jung T. Kim, Seoul, Rep. of Korea

[73] Assignee: Daewoo Electronics Co., Ltd., Seoul, Rep. of Korea

[21] Appl. No.: 173,171

[22] Filed: Dec. 27, 1993

[30] Foreign Application Priority Data

Dec. 31, 1992 [KR] Rep. of Korea .......................... 27170

[51] Int. Cl.$^6$ ............................ G11B 17/30; G11B 17/00
[52] U.S. Cl. .............................................. 369/215; 369/244
[58] Field of Search .................................. 369/215, 244, 369/219, 75.2, 77.1, 75.1, 77.2, 270; 360/99.02, 99.03, 99.06, 99.07, 105, 106

[56] References Cited

U.S. PATENT DOCUMENTS

| | | | |
|---|---|---|---|
| 4,829,508 | 5/1989 | Arita | 369/215 |
| 5,081,618 | 1/1992 | Abe | 369/244 |
| 5,097,465 | 3/1992 | Funabashi et al. | 369/199 |
| 5,172,361 | 12/1992 | Urushibata et al. | 369/77.1 |
| 5,251,195 | 10/1993 | Kawakami et al. | 369/77.1 |

FOREIGN PATENT DOCUMENTS

| | | | |
|---|---|---|---|
| 62-183081 | 8/1987 | Japan | 369/215 |
| 4137225 | 5/1992 | Japan | 369/215 |

Primary Examiner—John H. Wolff
Assistant Examiner—Allen Cao
Attorney, Agent, or Firm—Nixon & Vanderhye

[57] ABSTRACT

The present invention relates to an apparatus for tilt adjusting of an optical disc player which operates in cooperation with a cam gear consisting of a gear mechanism of a disc loading device installed on a main chassis and can perform a tilting motion without needing a tilt motor, wherein the apparatus comprises a guide member cooperating with the cam gear of the disc loading device and moving linearly in accordance with the rotation of the cam gear and an operation member connected to the guide member and adjusting the inclination of a pickup feeding plate while moving in accordance with the linear movement of the guide member, the cam gear having a spiral cam groove formed at the upper and bottom sides thereof, the guide member having at its upper side a projection slidably fitted to the lower cam groove formed at the bottom side of the cam gear, and opening, a rack portion being formed at one side of the opening, an operation gear consisting of upper and lower gear portions being engaged with the rack portion, the operation member constituting at its one side an operation rack engaged with the operation gear of the guide member and having at its upper side a stepped member having multistep on which an inclination adjusting rod projected from a pickup feeding plate is loaded.

4 Claims, 11 Drawing Sheets

APPARATUS FOR TILT ADJUSTING OF AN OPTICAL DISC PLAYER

BACKGROUND OF THE INVENTION

1. Field of the Invention

The present invention relates to an apparatus for tilt adjusting of an optical disc player, and particularly to an apparatus for tilt adjusting of an optical disc player to perform a tilting motion while operating in cooperation with a cam gear constituting a gear mechanism of a disc loading device installed on a main chassis of an optical disc player.

2. Description of the Prior Art

One of the requirements for optical pickup to read signals of the optical disc is that an optical axis must be perpendicular to a signal record face of an optical disc.

However, in case an optical disc is bent or curved, signals of an optical disc cannot be reproduced regularly because the surface of the disc and the optical axis of an object lens of a pickup cannot make a right angle relative to each other. Accordingly, an optical disc player according to the prior art adopts a tilt adjusting device enabling the object lens of a pickup to be perpendicular to an optical disc surface in such a way that an inclination angle is detected by installing a tilting sensor inside a pickup device, and when signals of the inclination angle thus detected are transmitted to a control circuit, the control circuit controls a tilt motor to rotate in response to the electric signals received.

As an example of a tilt adjusting device as mentioned above, U.S. Pat. No. 5,081,618 describes a tilt adjusting device to adjust an inclination of upper and lower chassis by an eccentric roller connected to a tilt motor and a spring interposed between a main chassis and a lower chassis.

However, a tilt adjusting device as mentioned above has a disadvantage that its structure is complex and the accuracy of tilting lacks because a tilt motor, upper and lower guiding members, rack member, etc., must be installed indispensably.

SUMMARY OF THE INVENTION

It is an object of the present invention to provide an apparatus for tilt adjusting of an optical disc player which can eliminate the aforenoted shortcomings and disadvantages encountered with the prior art, that is, to provide an apparatus for tilt adjusting of an optical disc player in which the structure is simplified without needing a tilt motor by operating in cooperation with a cam gear constituting a gear mechanism of a disc loading device installed on a main chassis of an optical disc player.

Another object of the present invention is to provide an optical disc player adopting a loading device and a tilt adjusting device which cooperate with each other.

In order to accomplish the above objects, the apparatus for tilt adjusting of an optical disc player according to the present invention comprising a disc loading device having a cam gear in which a spiral cam groove are formed on the upper side thereof, is characterized in that said apparatus comprises:

a guide member cooperating with said cam gear and moving linearly in accordance with the rotation of a cam gear; and an operation member connected to said guide member and adjusting the inclination of a pickup feeding plate while moving in accordance with the linear movement of said guide member, said cam gear having a spiral cam groove formed at the bottom side thereof.

The above and other objects, features and advantages of the present invention will become apparent from the following description and the appended claims, taken in conjunction with the accompanying drawings.

DESCRIPTION OF THE PREFERRED EMBODIMENT

Figure 1:
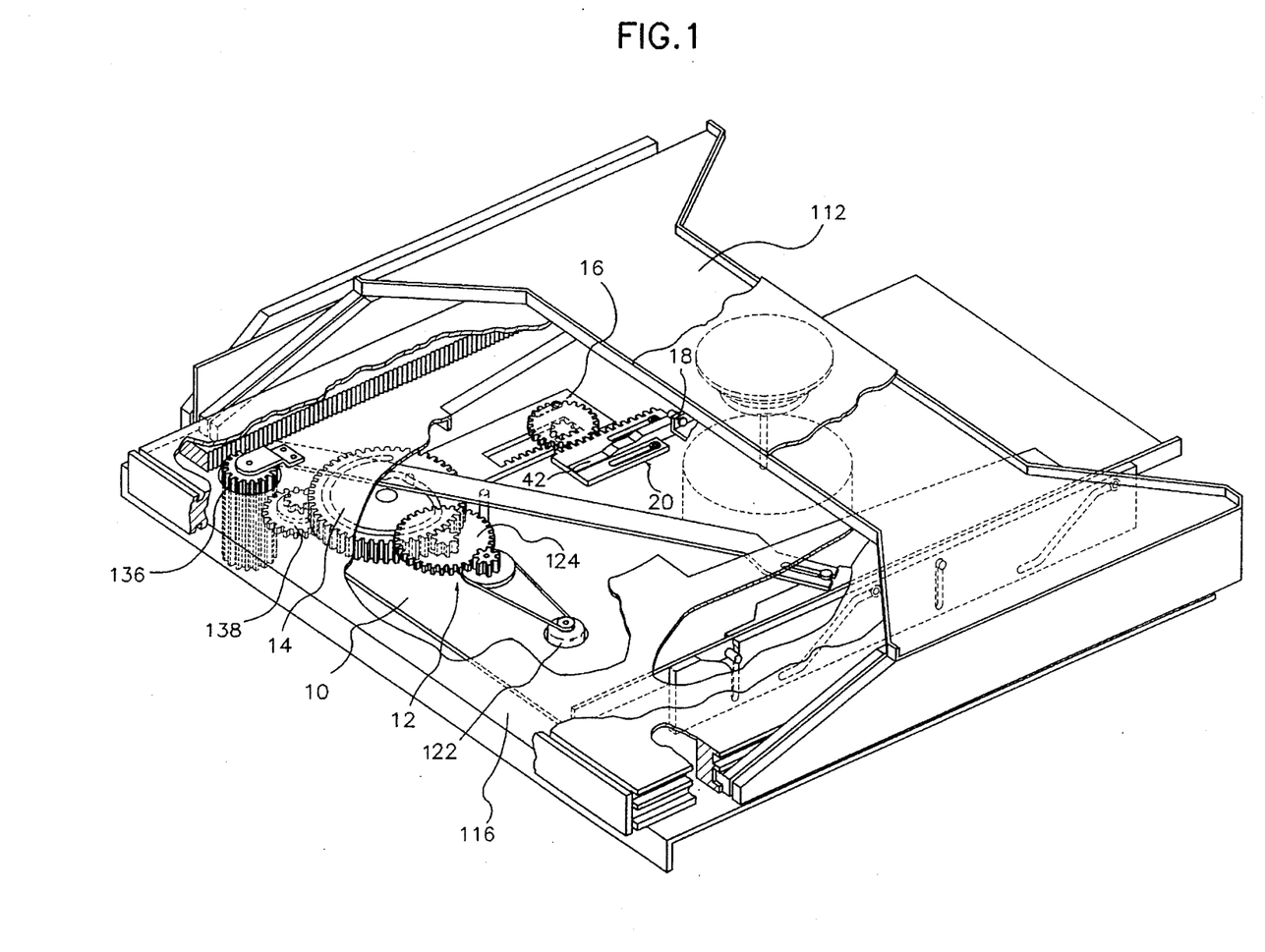
FIG. 1 is a schematic perspective view of an optical disc player wherein a tilt adjusting apparatus according to the present invention and a loading device cooperating therewith are installed.
Figure 2:
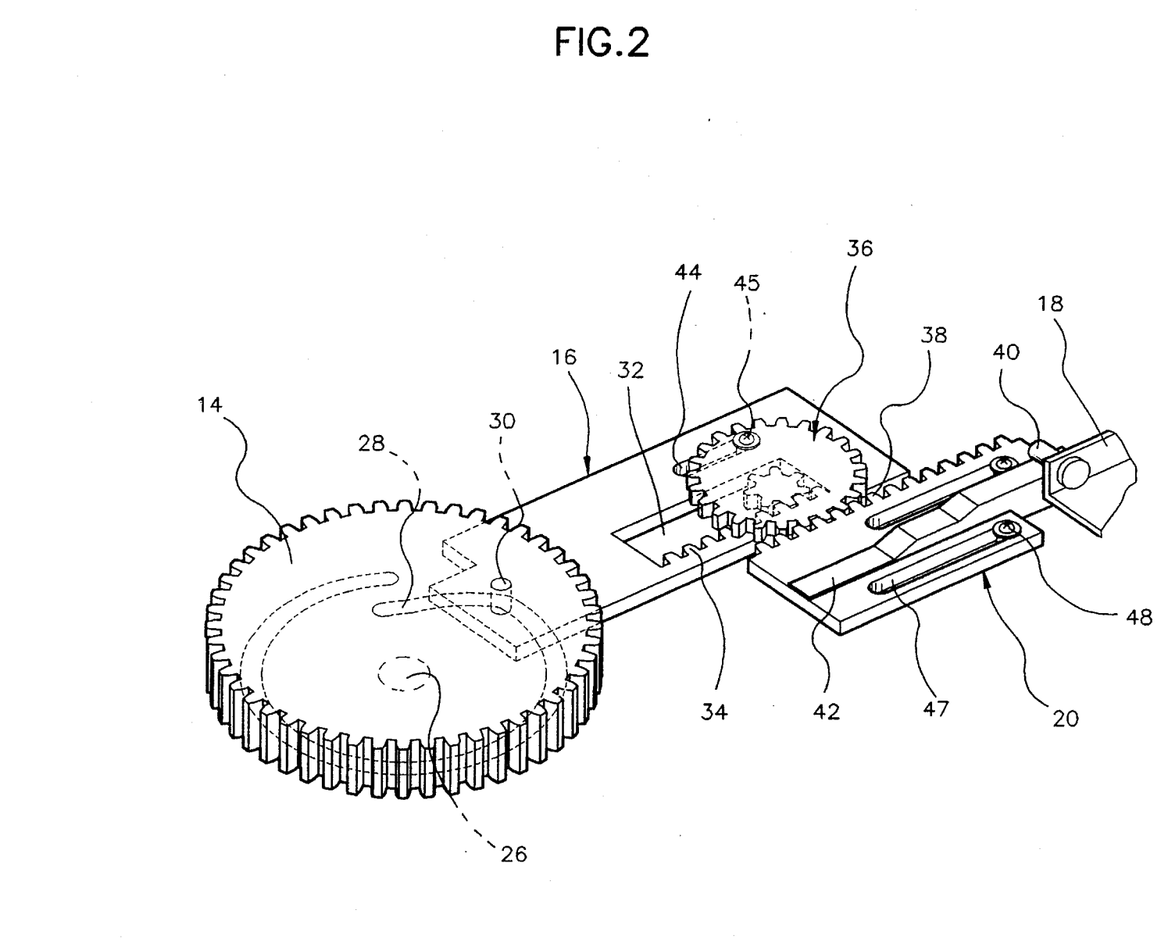
FIG. 2 is an enlarged view of a main portion of a tilt adjusting apparatus according to the present invention which is connected to a cam gear constituting a gear mechanism of a disc loading device.
Figure 3:
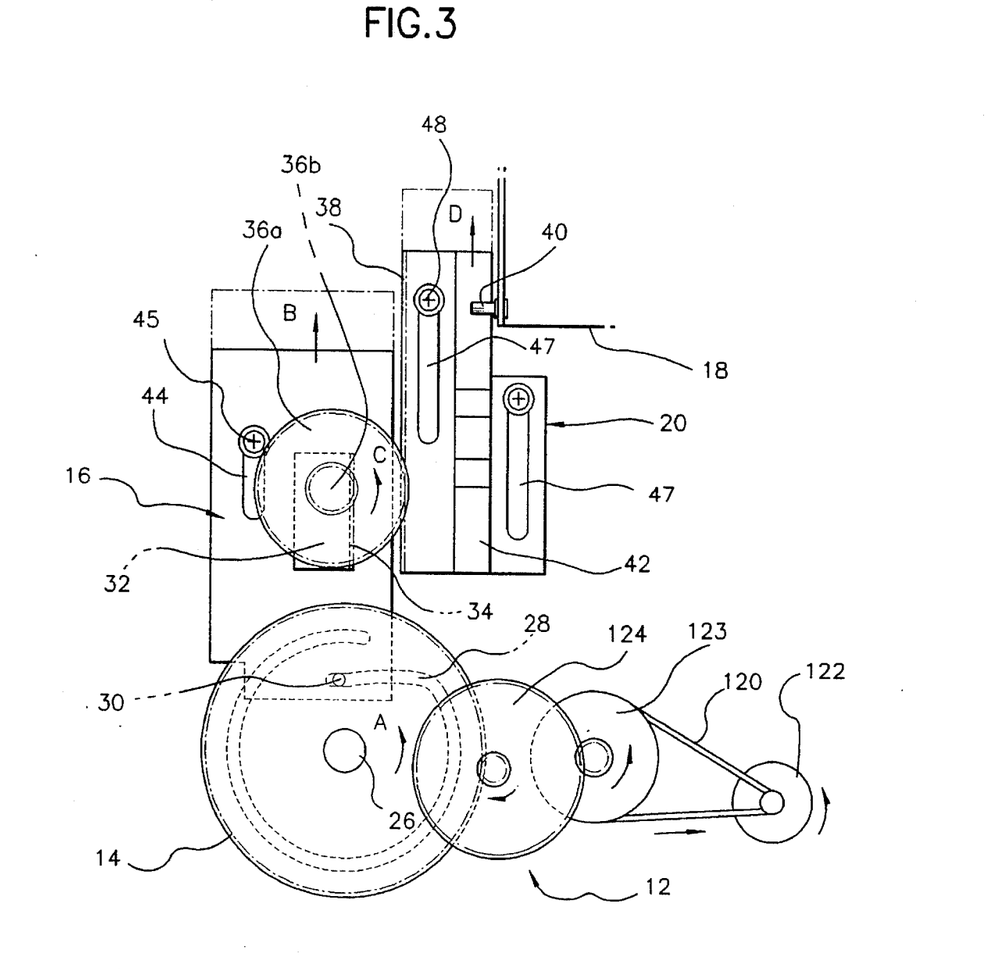
FIG. 3 is a plan view showing a gear mechanism of a disc loading device and a tilt adjusting apparatus according to the present invention.
Figure 9A:
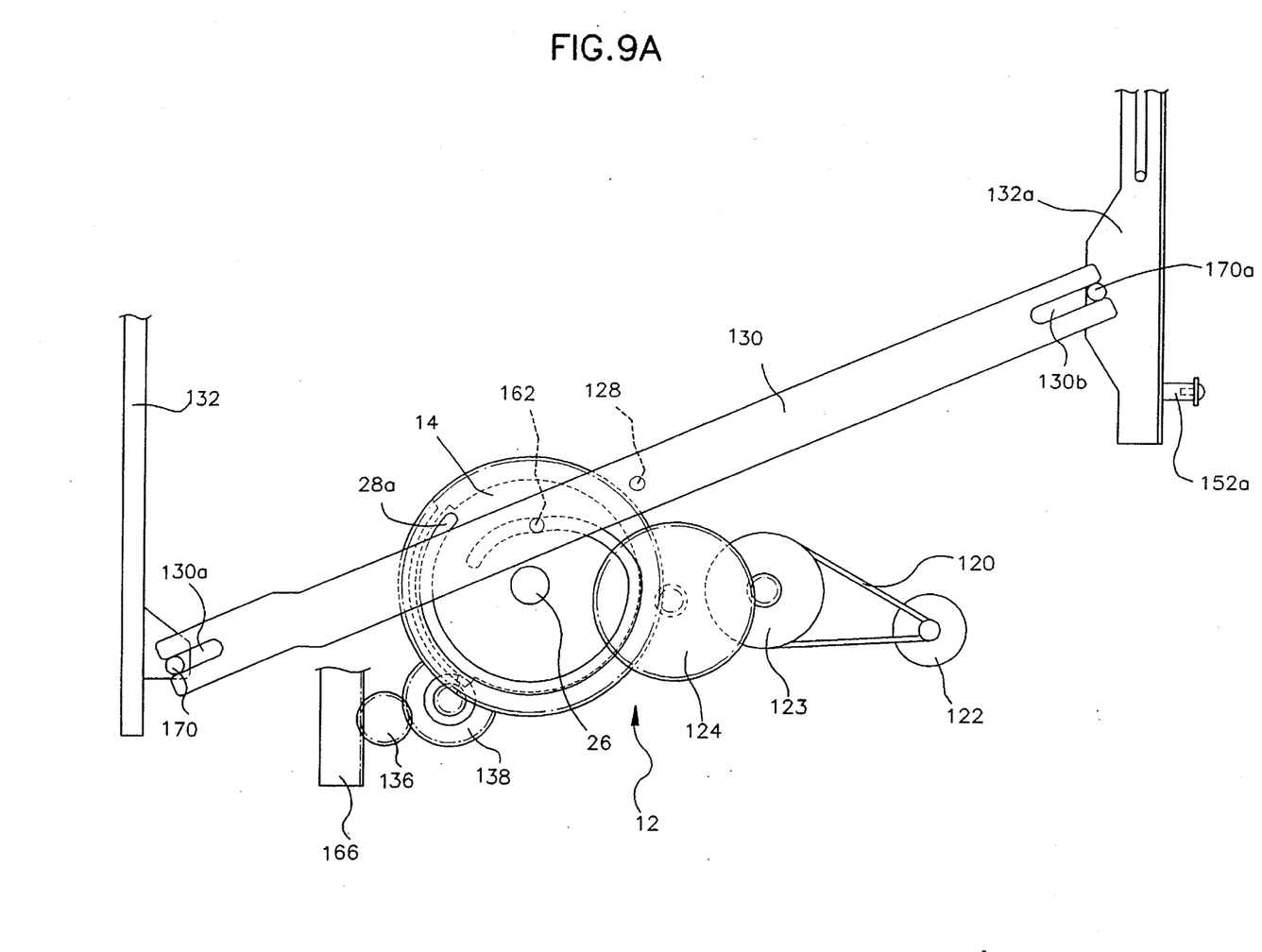
FIGS. 9A and 9B are an explanatory view showing the operation of a lift arm constituting said disc loading device.
Figure 9B:
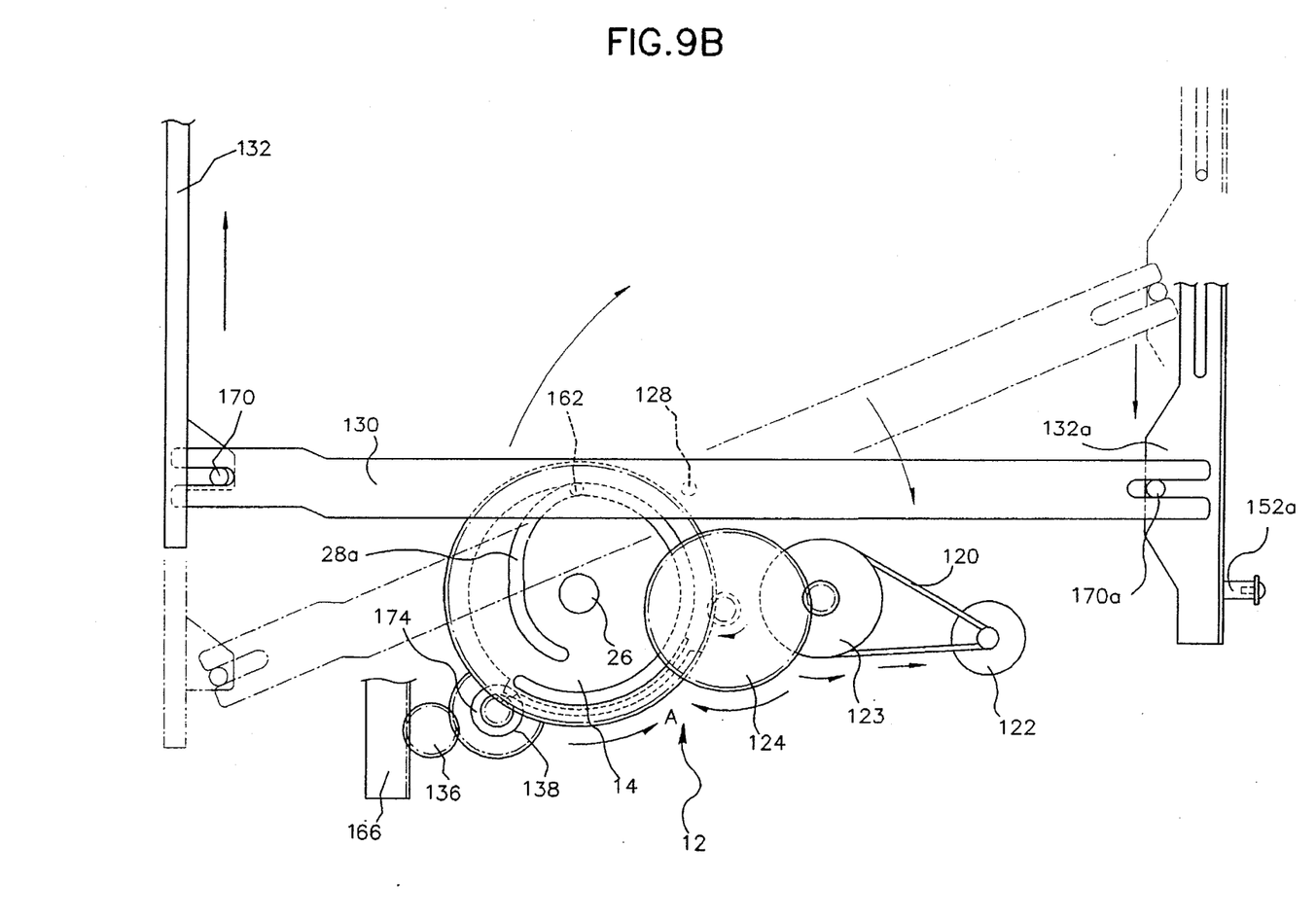
Figure 10:
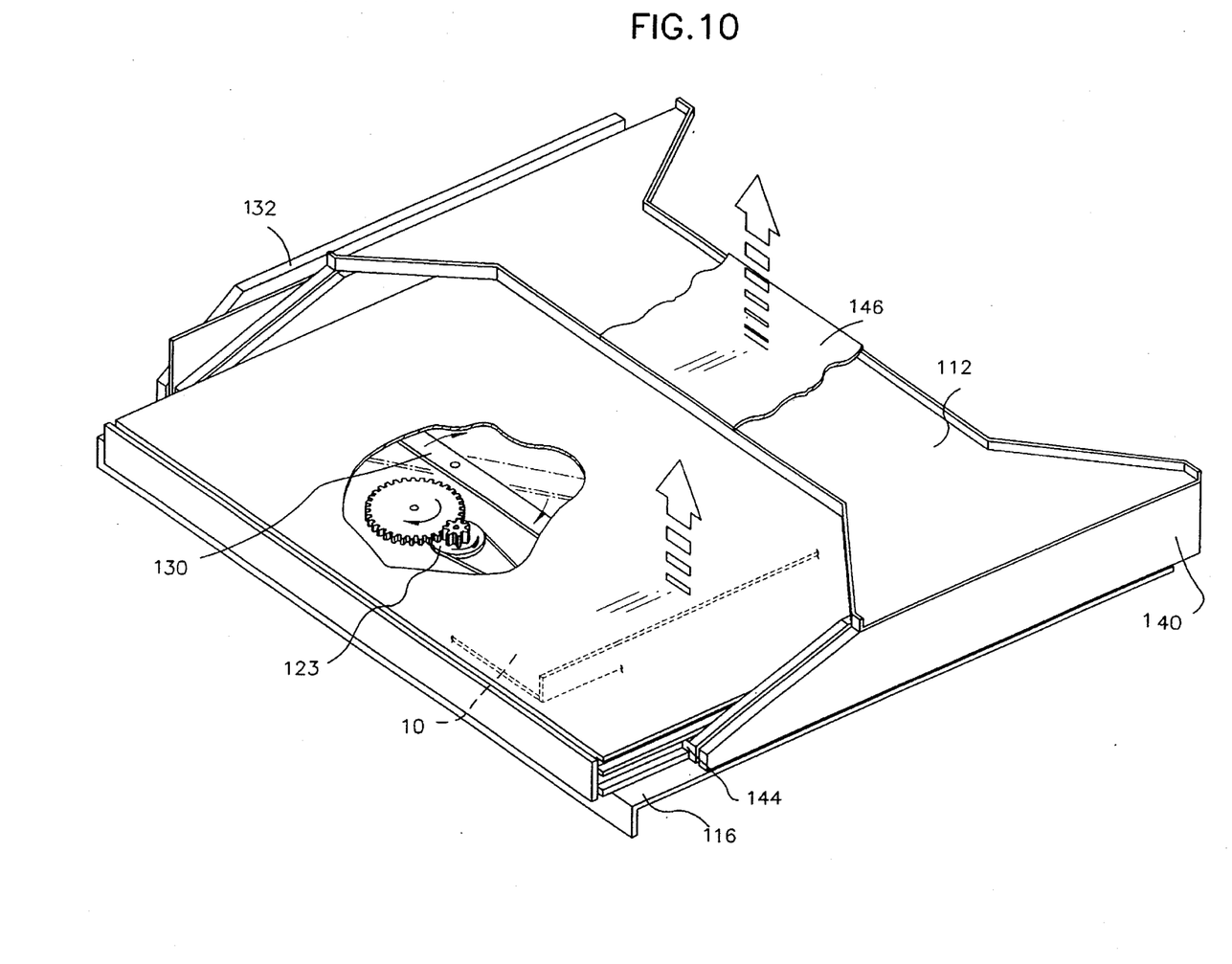
FIG. 10 is a perspective view showing the motion that a chuck arm and tray base are elevated in accordance with a disc loading device.
Figure 11:
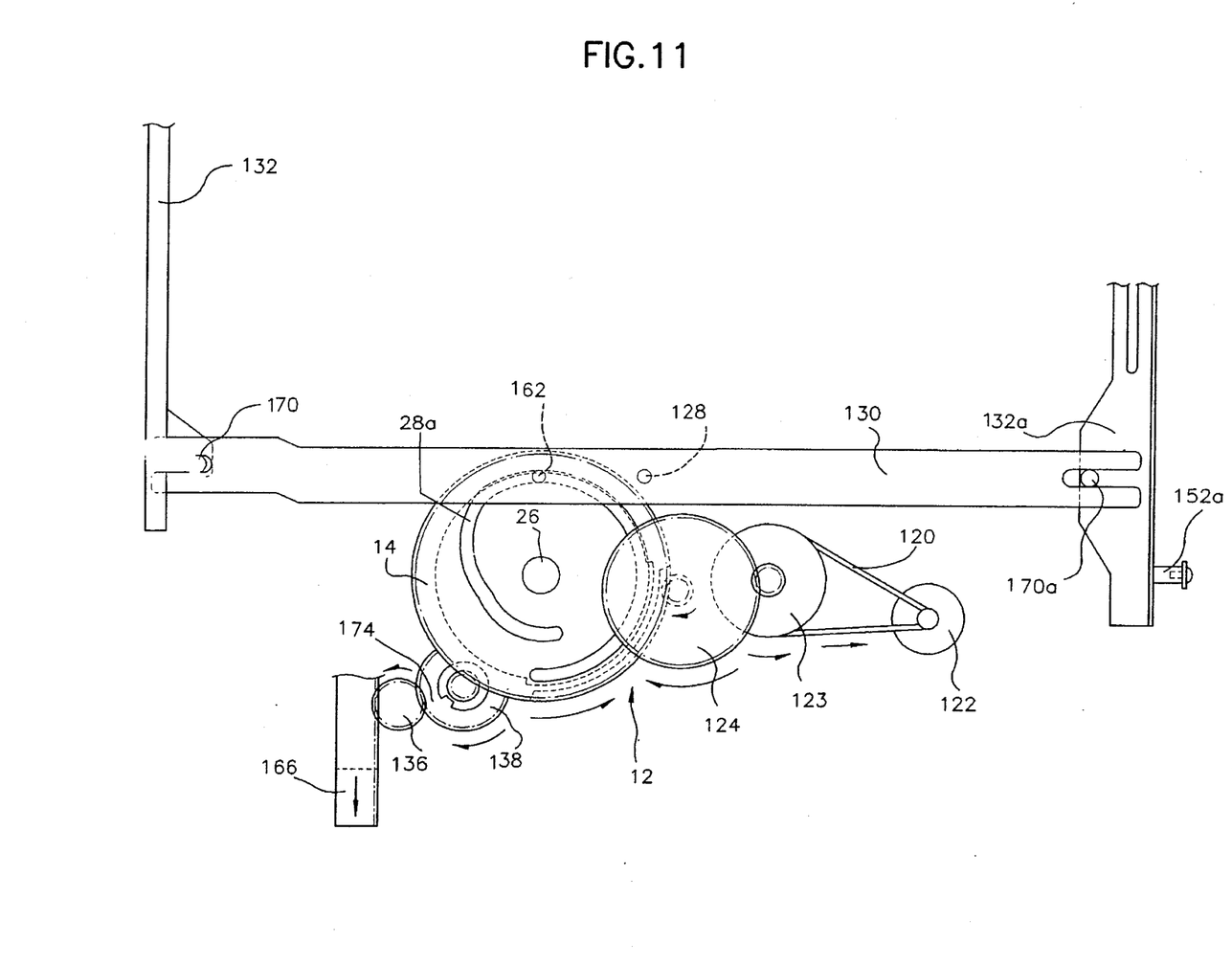
FIG. 11 is a lay-out of the cam gear.
Figure 12:
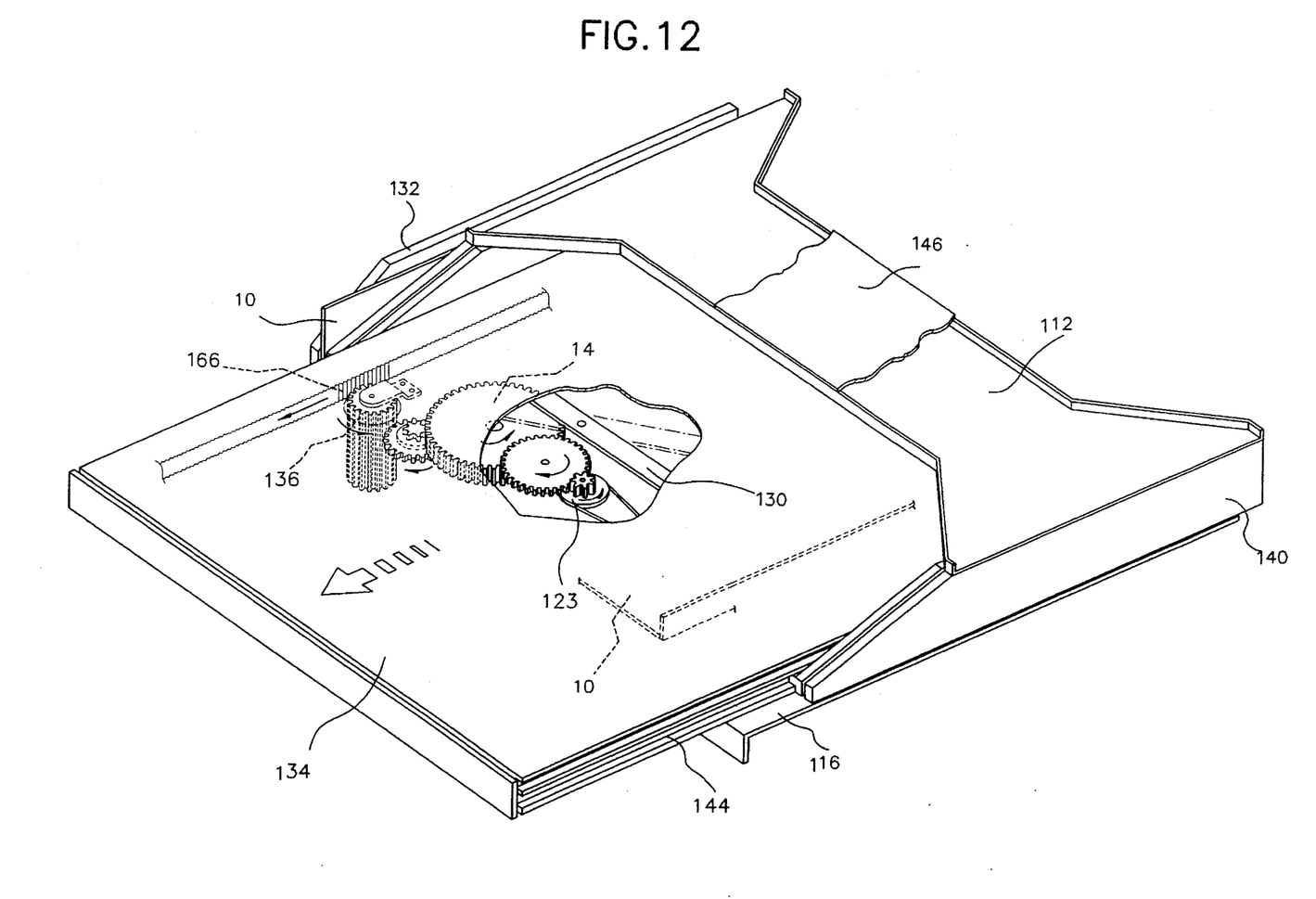
FIG. 12 is a perspective view showing the motion that a disc tray is operated forward by a rotation of the cam gear.

Referring to FIGS. 1 to 3, a cam gear 14 constitutes a gear mechanism 12 of a loading device of a disc player proposed in Korean Patent Application No. 92-27170 and Japanese Patent Application No. 93-300210 by the present inventor, and as shown in FIGS. 9A and 9B, a spiral cam groove 28a (hereinafter referred to as "upper cam groove") is formed on the upper side thereof and a spiral cam groove 28 (hereinafter referred to as "lower cam groove") which is similar to the upper cam groove 28a is formed at the bottom side thereof.

The upper and lower cam grooves 28a, 28 are formed in such a way that they are eccentric with respect to a rotation shaft 26 to the predetermined degree to extend clockwise and then they become concentric with respect to the rotation shaft 26 from the point at which the eccentric part ends. Said loading device of a disc player will be explained later.

As shown in FIG. 3, in the gear mechanism 12 of said disc loading device, one end of the cam gear 14 installed on a main chassis 10 is connected to a driving motor 122 via a reduction gear 124, a pulley 123 and a belt 120 and the other end is engaged with a force transmitting gear 138. (see FIGS. 9A and 9B).

A guide member 16 has a projection 30 slidably fitted to the lower cam groove 28 of the cam gear 14 on its upper side and has an opening 32 at its central side. The opening 32 has a rack portion 34 formed at its one end, a lower gear portion 36b of an operation gear 36 being engaged with the rack portion 34 to enable the operation gear 36 to rotate when the guide member 16 is in the forward or backward linear movement.

Further, considering the displacement of the movement, a guide slot 44 is formed in the guide member 16 and a guide pin 45 fixed in the main chassis 10 is fitted in the guide slot 44 to enable the linear movement of the guide member 16 to be guided.

Meanwhile, as shown in FIGS. 1 and 2, an operation member 20 has an operation rack 38 formed at its one end to engage with an upper gear portion 36a. In addition, on the upper side of the operation member 20, a stepped member 42 having multistep on which an inclination adjusting rod 40 projecting from a pickup feeding plate 18 is loaded is formed, a pair of guide pin 48 fixed on the main chassis 10 being adapted to fitted in a guide slot 47 to enable the forward or backward linear movement to be guided.

A disc loading device operating in cooperation with a tilt adjusting apparatus according to the present invention is explained hereinafter.

Figure 6:
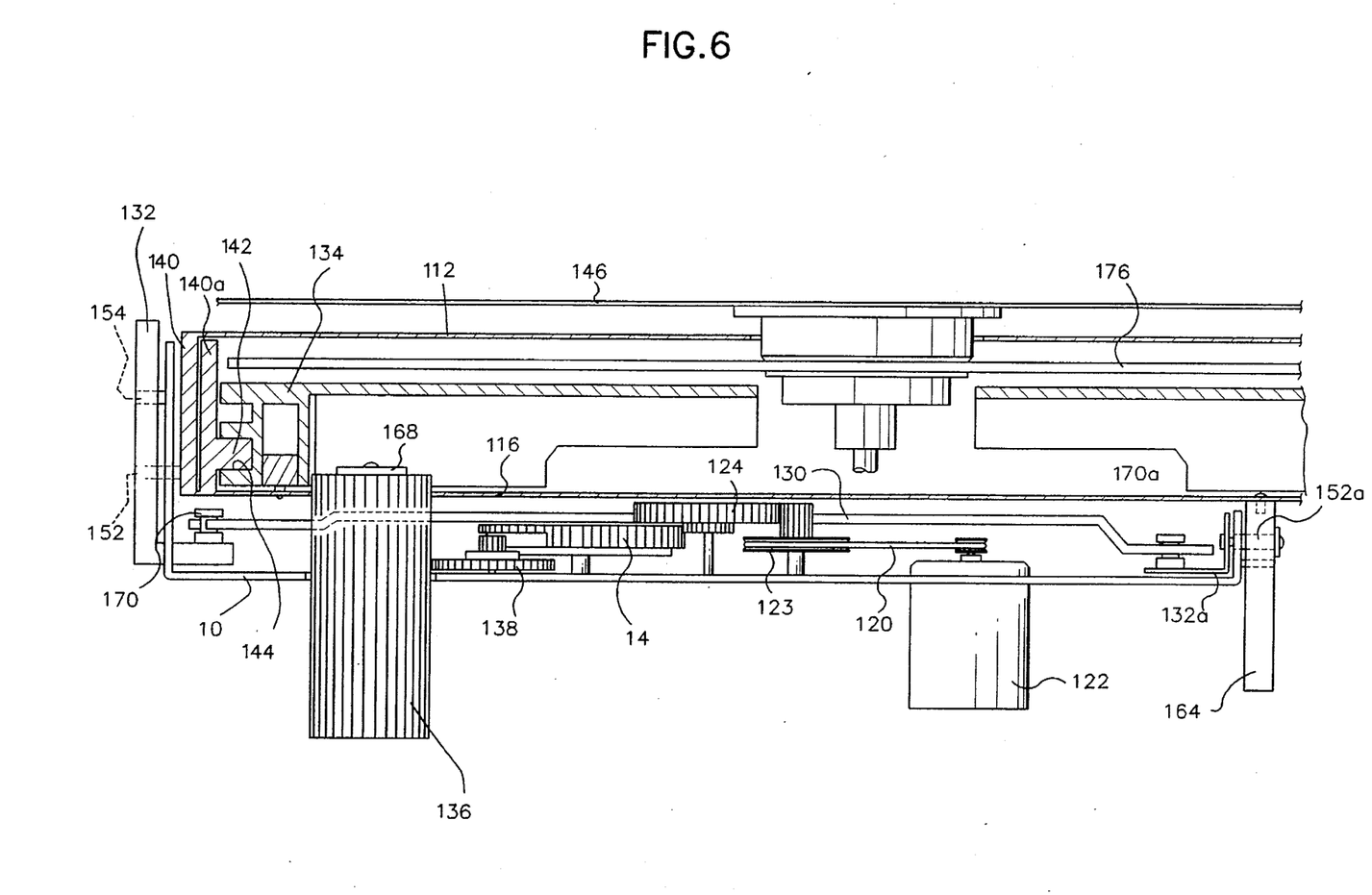
FIG. 6 is a longitudinal sectional view omitting a tilt adjusting apparatus according to the present invention in FIG. 1.

An shown in FIGS. 1 and 6, a tray base 116 on which a disc tray 134 is mounted is integrally connected to a chuck arm 112 via an outer vertical plate 140 and installed on the upper side of the main chassis 10.

Referring to FIGS. 1 and 9A, a pivotal pin 128 is formed at the lower central portion of a lift arm 130 and the lift arm 130 is rotatably installed to the main chassis 10 via said pivotal pin 128. The lift arm 130 have a downwardly inclined step in the vicinity of its opposite ends, and slots 130a, 130b are formed at said opposite ends to be slidably connected to pins 170, 170a installed at a first and a second sliding plate 132, 132a, respectively.

Further, a projection 162 is formed between the pivotal pin 128 of the lift arm 130 and slot 130a, said projection 162 being fitted to the upper cam groove 28a and being slidable along the upper cam groove 28a.

Figure 5:
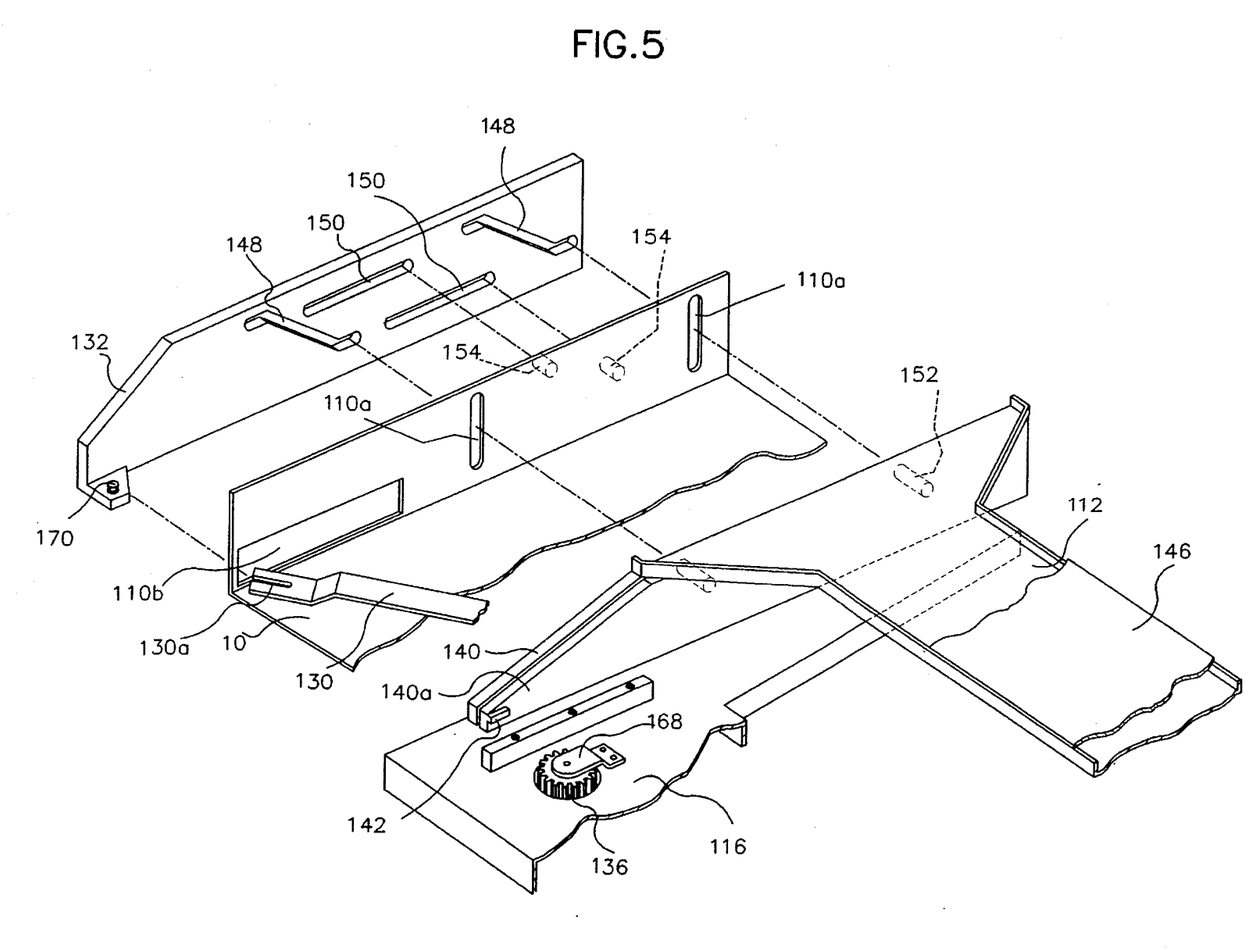
FIG. 5 is an enlarged perspective view of a main portion of a disc loading device in cooperation with a tilt adjusting apparatus according to the present invention.

Referring to FIG. 5, at the outer side of the outer vertical plate 140 connecting the tray base 116 and the chuck arm 112 integrally each other, a guide pin 152 is formed projectingly which is adapted to be slidably fitted to an inclined guide hole 148 of the first sliding plate 132 via a vertical guide hole 110a of the main chassis 10.

A guide rib 142 formed inside an inner vertical pin 140a is slidably connected to a guide groove 144 formed at one end of the disc tray 134 mounted on the tray base 116. (see FIG. 6).

Referring to FIGS. 5 and 6, the first sliding plate 132 has at its lower projection a pin 170 connected to the slot 130a of the lift arm 130 rotatably, and at its vertical side a pair of horizontal guide hole 150 and a pair of inclined guide hole 148 are provided in a spaced relationship. Opposite ends of the inclined guide hole 148 are formed horizontally. At the left vertical end of the main chassis 10 disposed at the inner side of the first sliding plate 132, a pair of vertical guide hole 110a are formed, and a pair of guide pin 154 slidably fitted into a horizontal guide hole 150 of the first sliding plate 132 are provided.

Additionally, a rectangular opening 110b is formed at the lower part of the main chassis 10 so that the left end of the lift arm 130 can pass therethrough.

As shown in FIG. 6, a guide pin 152a is projectingly formed outwardly at the second sliding plate 132a disposed at the inner side of the right vertical end of the main chassis 10, the upper side of the second sliding plate 132a being slidably fitted to an inclined guide hole 148a formed at an ascending and descending operation plate 164 connected to the tray base 116.

As previously explained, one end of the force transmitting gear 138 is engaged with the cam gear 14, and as shown in FIGS. 1 and 9A, the other end is engaged with an operation gear 136 engaging with an operation rack 166 formed in inner side of the disc tray 134. The pulley 123, reduction gear 124, cam gear 14, force transmitting gear 138 and operation gear 136 constitute a gear mechanism of the disc loading device, and upper side of the operation gear 136 is connected to the tray base 116 by a bracket 168 and thus enabled to move upward and downward in the state of being connected to the operation rack 166 in accordance with the ascending or descending motion of the tray base 116.

Figure 7:
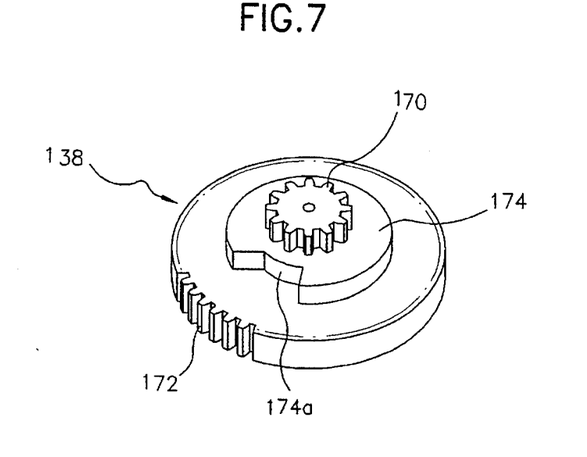
FIG. 7 is a perspective view of a force transmitting gear of said disc loading device.

FIG. 7 shows the force transmitting gear 138 installed between the operation gear 136 and the cam gear 14, said force transmitting gear comprising an upper gear 170 engaging with the cam gear 14 and a lower gear 172 engaging with the operation gear 136, a circular rotating plate 174 equipped with anti-rotation groove 174a being installed between the upper and lower gear 170, 172, said anti-rotation groove 174a making a role to prevent the rotating force from being transmitted to the operation gear 136 when the cam gear 14 operates the lift arm 130.

Figure 8A:
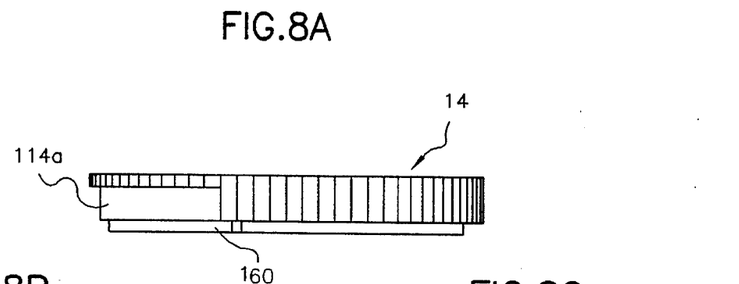
FIGS. 8A to 8C are a front view, a plan view and a bottom view of said cam gear, respectively.
Figure 8B:
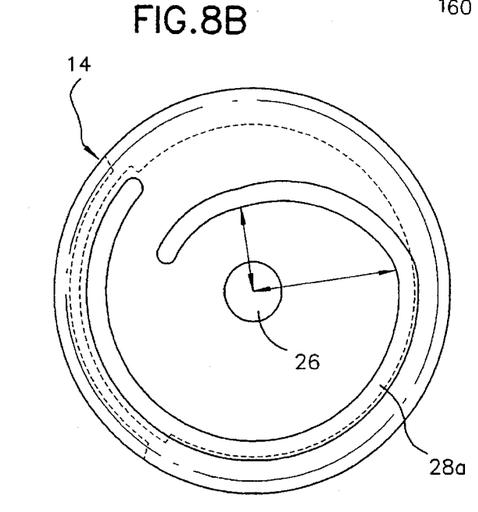
Figure 8C:
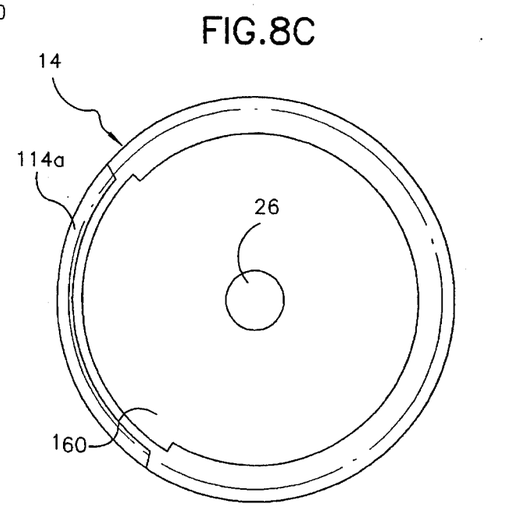

As shown in FIGS. 8A and 8C, at the bottom side of the cam gear 14, there is formed an anti-rotation projection 160 and cut-off portion 114a adapted to intercept the force transmitted to the operation gear 136 while the cam gear 14 elevates a combined body of the chuck arm 112 and the tray base 116.

The operation of the tilt adjusting apparatus according to the present invention is explained herebelow.

As shown in FIG. 3, when a tilting sensor (not shown) within a pickup (not shown) detects the inclination angle of the disk loaded on the turntable (not shown), and converts it to an electric signal to apply it to the driving motor 122, thereafter the driving motor 122 is driven and thereby the cam gear 14 pushes the projection 30 fitted to the lower cam groove 28 of the cam gear 14 to the radial direction while moving rotatively to the direction marked arrow A, and thus the guide member 16 makes a linear motion backwardly, i.e., to the direction marked arrow B and rotates the operation gear 36 engaged with the rack portion 34 of the opening 32 to the direction marked arrow C.

Figure 4:
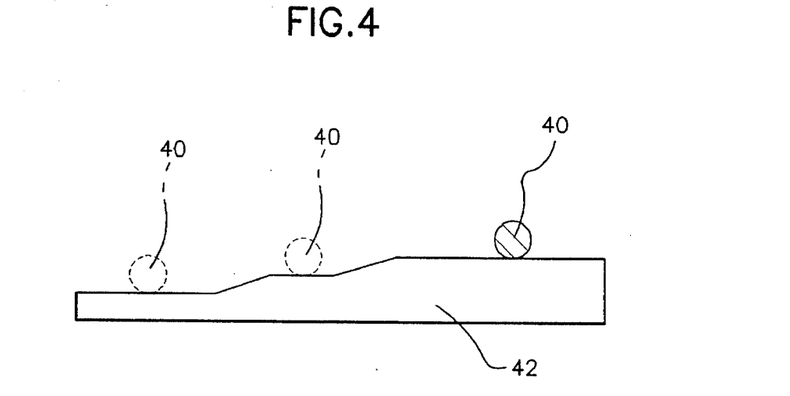
FIG. 4 is a side view showing that a stepped member of an operation member is contacting with an inclination adjusting rod.

Resultingly, the operation member 20 is moved to the direction marked arrow D and thus the stepped member 42 formed on the operation member 20 slides under the state of contact with the inclination adjusting rod 40 of the pickup operation plate 18 maintained, whereby a tilting motion is performed by adjusting the inclination of the pickup operation plate 18, as shown in FIG. 4.

It is to be noted that when the inclination angle is changed to the contrary, reverse process to that described above is made by way of the reverse rotation of the driving motor 122.

Thus, the tilting adjusting apparatus according to the present invention has the advantages that simplification in structure and reduction in production cost can be attained by using the driving motor of the disc loading device without installing the tilt motor and accuracy in tilting operation can be attained by providing the stepped member on the operation member.

What is claimed is:

1. A tilt adjusting apparatus in an optical disc player, including a disc loading device for adjusting an object lens of a pickup to be perpendicular to an optical disc surface, said apparatus comprising:

a cam gear having at an upper side an upper spiral cam groove for moving a tray base and having at a lower side a lower spiral cam groove;

a guide member cooperating with said cam gear lower spiral cam groove and moving linearly in accordance with the rotation of the cam gear, wherein said guide member has at an upper side a projection slidably fitted to said lower spiral cam groove, an opening at a central portion, and a rack portion being formed at one end of the opening, an operation gear consisting of an upper gear portion and a lower gear portion, said lower gear portion being engaged with said rack portion; and an operation member, connected to said guide member, for adjusting inclination of a pickup feeding plate while moving in accordance with the linear movement of said guide member, wherein said operation member is provided at one side with an operation rack engaged with said upper gear portion of said operation gear of said guide member, said operation rack having at an upper face a stepped member having multistep on which an inclination adjusting rod projected from the pickup feeding plate is loaded.

2. A tilt adjusting apparatus in an optical disc player according to claim 1, wherein said lower spiral cam groove is eccentric with respect to a rotation shaft to extend clockwise and it becomes concentric with respect to said rotation shaft from the point at which the eccentric part ends.

3. A tilt adjusting apparatus in an optical disc player according to claim 1, wherein said guide member and operation member are guided to move by respective guide means formed therein, respectively.

4. An optical disc player comprising:

a loading device including a tray base integrally connected to a chuck arm, a gear mechanism consisting of a pulley, a reduction gear, a cam gear having at an upper side an upper spiral cam groove and having at a lower side a lower spiral cam groove, a force transmitting gear and an operation gear;

a lift arm connected to said cam gear and opposite ends of which rotate centering around a pivotal pin in accordance with a rotation of said cam gear;

first and second sliding plates movably connected to the opposite ends of said lift arm to guide the combined body of said chuck arm and said tray base to be elevated, and a disc tray mounted on said tray base and having an operation rack engaged with said operation gear at its inner side;

an apparatus for adjusting an object lens of a pickup to be perpendicular to an optical disc surface, said apparatus operatively cooperating with said loading device in order to move a guide member, said apparatus including said guide member cooperating with said cam gear via said lower spiral cam groove, and moving linearly in accordance with the rotation of the cam gear, said guide member having at an upper side a projection slidably fitted to said lower spiral cam groove, an opening at a central portion, a rack portion being formed at one end of the opening and an operation gear consisting of an upper gear portion and a lower gear portion, said lower gear portion being engaged with said rack portion; and an operation member connected to said guide member, for adjusting an inclination of a pickup feeding plate while moving in accordance with the linear movement of said guide member, said operation member being provided at one side with an operation rack engaged with said upper gear portion of said operation gear, said operation rack having at an upper face a stepped member having multistep on which an inclination adjusting rod projected from the pickup feeding is loaded.

* * * * *